United States Patent [19]

Togawa

[11] Patent Number: 5,900,100
[45] Date of Patent: May 4, 1999

[54] METHOD OF PRODUCING PLASMA ADDRESSED DISPLAY DEVICE

[75] Inventor: Takahiro Togawa, Kanagawa, Japan

[73] Assignee: Sony Corporation, Tokyo, Japan

[21] Appl. No.: 08/647,180

[22] Filed: May 9, 1996

[30] Foreign Application Priority Data

May 9, 1995 [JP] Japan .................................. 7-110447

[51] Int. Cl.⁶ .................................................. B32B 33/00
[52] U.S. Cl. ............................................ 156/292; 156/99
[58] Field of Search ...................... 156/292, 99

[56] References Cited

U.S. PATENT DOCUMENTS

| | | | |
|---|---|---|---|
| 5,351,144 | 9/1994 | Tanamachi | 359/54 |
| 5,525,862 | 6/1996 | Miyazaki | 313/582 |

Primary Examiner—Francis J. Lorin
Attorney, Agent, or Firm—Hill & Simpson

[57] ABSTRACT

To provide a method of producing a plasma addressed display device which can prevent a gap unevenness of the liquid crystal layer and cracking of a dielectric sheet due to intrusion of dust as much as possible, a method of production of a plasma addressed display device in which a plasma substrate glass 31 constituting a plasma cell 3 and a dielectric sheet 4 face each other via a plurality of partition walls 4 provided in parallel, wherein parts of the partition walls 5 are formed on the dielectric sheet 4 and, at the same time, parts of the partition walls 5 are formed on the plasma substrate glass 31, and these dielectric sheet 4 and plasma substrate glass 31 are bonded so as to complete the partition walls 6 by combining the parts of the partition walls 5 formed on them with each other.

3 Claims, 5 Drawing Sheets

FIG. 1A
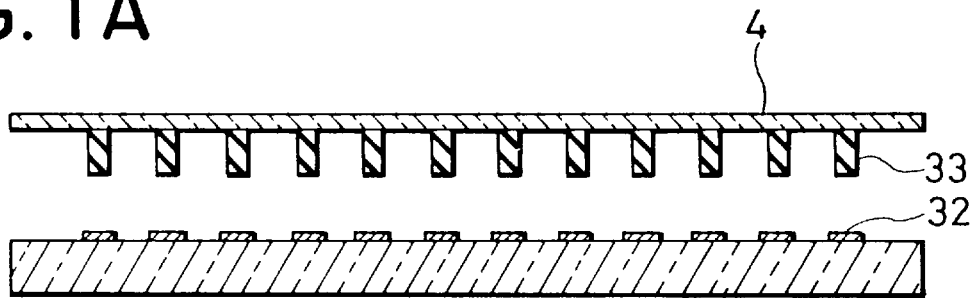
FIG. 1B
FIG. 2A
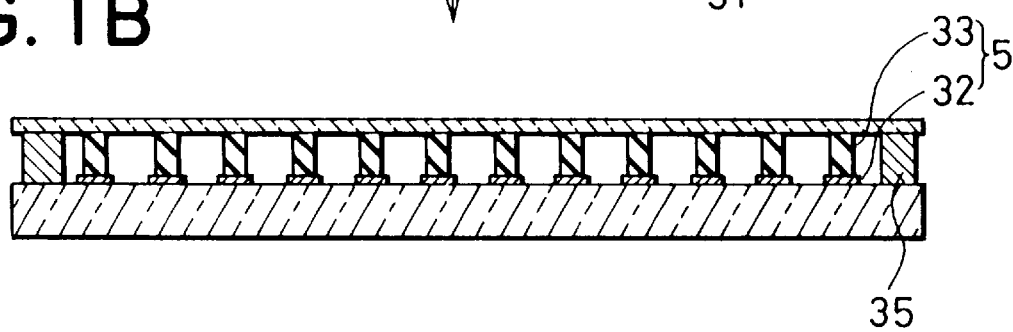
FIG. 2B

METHOD OF PRODUCING PLASMA ADDRESSED DISPLAY DEVICE

BACKGROUND OF THE INVENTION

1. Field of the Invention

The present invention relates to a method of producing a plasma addressed display device having a liquid crystal cell and a plasma cell superimposed on each other with a dielectric sheet therebetween.

2. Description of the Related Art

In recent years, a plasma addressed display device formed by superimposing a liquid crystal cell and a plasma cell via a dielectric sheet has been proposed. FIG. 3 shows an example of this plasma addressed display device.

The plasma addressed display device of FIG. 3 has a flat panel structure wherein a liquid crystal cell 2 and a plasma cell 3 are superimposed via a dielectric sheet 4.

In the liquid crystal cell 2, a color filter substrate 21 is bonded to the dielectric sheet 4 at a predetermined clearance via a sealing material 22. On the surface of the inner side of the color filter substrate 21, strip-shaped data electrodes made of a transparent electrically conductive material, which are not illustrated, but extend in the row direction, are formed in parallel in a column direction (a perpendicular direction to the plane of the figure). A liquid crystal material is filled in the clearance, or space, between the color filter substrate 21 and the dielectric sheet 4, to form a liquid crystal layer 23. Although not shown in FIG. 3, spacers are arranged in the liquid crystal layer 23 so as to make the dimensions of the liquid crystal clearance uniform.

In the plasma cell 3, the plasma substrate glass 31 is spaced from the dielectric sheet 4 at a predetermined clearance. On the plasma substrate glass 31 on the dielectric sheet 4 side are formed strip-like display electrodes 32 made of nickel or the like which extend in the column direction and are formed in parallel to one another at a predetermined interval in the row direction. On these display electrodes 32, barrier ribs 33 made of an insulating ceramic or the like and having a narrower width than the display electrodes 32 are formed at an equal pitch to that of the display electrodes 32. The plasma substrate glass 31 faces the dielectric sheet 4 at a predetermined clearance via these display electrodes 32 and barrier ribs 33. These display electrodes 32 and barrier ribs 33 constitute the partition walls 5. The sealed spaces defined by these partition walls 5 constitute the plasma chambers 34. These plasma chambers 34 are formed so as to extend in the column direction at a predetermined interval in the row direction. An ionizable gas is sealed in the plasma chambers 34. The ionizable gas to be used is, for example, helium, neon, argon, a mixture of them, etc. In this way, the display electrodes 32 and the barrier ribs 33 serve as the partition walls 5 defining the plasma chambers and, at the same time, also serve as the clearance spacers of the plasma chambers. Note that the display electrodes 32 are connected to a driver circuit and are driven thereby so as to alternately serve as the anode display electrodes 32A and the cathode display electrodes 32K. A frit seal 35 of a low melting point glass or the like is arranged on the peripheral portions of the plasma substrate glass 31. The plasma substrate glass 31 and the dielectric sheet 4 are tightly bonded by this frit seal 35.

In the plasma addressed display device, the data electrodes and the plasma chambers 34 intersect with each other, the data electrodes serve as column driving units, the plasma chambers 34 serve as the row driving units, and pixels are defined at the intersections of the data electrodes and plasma chambers.

In such a plasma addressed display device, when a predetermined voltage is applied between an anode display electrode 32A and a cathode display electrode 32K, part of the gas in that plasma chamber is selectively ionized, a plasma discharge is generated, and an internal portion of the plasma chamber is maintained at substantially an anode potential. When a data voltage is applied to the data electrode in this state, the data voltage is written in the liquid crystal layer 23 via the dielectric sheet 4 at the pixels aligned in the column direction corresponding to the plasma chamber 34. When the plasma discharge is terminated, the plasma chamber 34 voltage floats, and the voltage written in the liquid crystal layer 23 at the corresponding pixel is held until the next write period (for example after one frame). At this time, the plasma chamber 34 acts as a sampling switch, and the liquid crystal layer 23 at the respective pixels acts as sampling capacitors.

As a result of the operation of the liquid crystal by the data voltage that is written from the data electrode 15 to the liquid crystal layer 23 at the respective pixels, the display is carried out pixel by pixel. Accordingly, by generating a plasma discharge and sequentially scanning the plasma chambers 34 in the row direction, which writes the data voltage in the liquid crystal layers 23 at a plurality of pixels aligned in the column direction, the display of a two-dimensional image can be carried out.

Briefly explaining the method of production of such a plasma addressed display device by referring to FIG. 4, first, as shown in FIG. 4(A), a display electrode pattern is printed on the plasma substrate glass 31 in the form of stripes by, for example, a screen printing method, then these stripes are dried or cured to form the display electrodes 32.

Next, barrier ribs 33 are superimposed on the already formed display electrodes 32 by repeatedly screen printing stripes so as to stack the ribs on the electrodes as shown in FIG. 4(B). In this case, repeated coating is carried out by repeating the screen printing to obtain a height of about 200 $\mu$m for the barrier ribs 33. After the barrier ribs have reached a predetermined height by the printing steps, the assembly is sintered and the tops of the barrier ribs are ground to unify the heights of the barrier ribs at a predetermined height.

Then, as shown in FIG. 4(C), a frit seal 35 is formed on the peripheries of the plasma substrate glass 31 by a dispenser or the like, the dielectric sheet 4 made of glass is placed on the barrier ribs, the dielectric sheet is bonded to the plasma substrate glass via this frit seal 35, the plasma chambers 34 which are formed thereby are evacuated, and then a gas is injected into the chambers.

Next, a not illustrated orientation processing is carried out. As shown in FIG. 4(D), spacers 24 for making the thickness of the liquid crystal layer uniform are applied about the dielectric sheet 4. As shown in FIG. 4(E), the color filter 21 is bonded to the dielectric sheet 4 via the sealing material 22 to form a liquid crystal chamber, and the liquid crystal is then injected into the space between the dielectric and the color filter to obtain a plasma addressed display device shown in FIG. 3.

When the dielectric sheet 4 is placed on the barrier ribs 33 and bonded to the plasma substrate glass 31, as shown in FIG. 5, dust particles D of about 5 to 10 $\mu$m or so in diameter is sometimes sandwiched between the joined surfaces of the barrier ribs 33 and the dielectric sheet 4. The dielectric sheet 4 is a thin glass plate having a thickness of about 50 $\mu$m, and the liquid crystal layer to be formed on the dielectric sheet 4 has a thickness of about 7 $\mu$m, and therefore if dust D having such a size is sandwiched between the barrier ribs 33 and the dielectric sheet 4, an unevenness of the gap of the liquid crystal layer 23 and as a result an unevenness of the liquid crystal display occurs. In addition to this, the dielectric sheet 4 which is constituted by the thin glass plate is pressed against the barrier ribs 33, and is caused to deform locally as it is pressed against the ribs in the parts over the dust particles D and sometimes the glass plate cracks. For this reason, a panel in which dust D has entered in this way is a sub-standard article and therefore causes an increase in manufacturing costs.

SUMMARY OF THE INVENTION

The present invention was made in consideration of the above circumstances and has as an object thereof to provide a method of producing a plasma addressed display device which can prevent unevenness in the gap of the liquid crystal layer and the cracking of the dielectric sheet due to the presence of dust as much as possible.

So as to achieve this and other objects, the method of production of a plasma addressed display device of the present invention is a method of producing a plasma addressed display device wherein a liquid crystal cell and a plasma cell are superimposed via a dielectric sheet, a plasma substrate glass constituting the plasma cell and the dielectric sheet face each other and are spaced apart from each other via a plurality of partition walls provided in parallel, wherein parts of the partition walls are formed on the dielectric sheet and, at the same time, parts of the partition walls are formed on the plasma substrate glass, and the dielectric sheets and the plasma substrate glass are joined so as to join the parts of the partition walls formed thereon and thereby together form the partition walls.

In this case, it is preferable that the completed partition walls be formed by display, or discharge, electrodes formed on the plasma substrate glass and by barrier ribs formed on the dielectric sheet. In other words, the ribs are on the electrodes so that the walls are made up of the ribs and the electrodes.

Alternatively, it is preferable that the complete partition walls are formed by, on one hand, the display electrodes formed on the plasma substrate glass and a divided portion of the barrier ribs formed on the display electrodes, and, on the other hand, the other divided portion of the barrier ribs formed on the dielectric sheet.

The method of production of the plasma addressed display device of the present invention improves the method of production of the partition walls constituting the plasma chambers and can reduce the effect of the intermixture of dust as much as possible.

Conventionally, the display electrodes which make-up part of the partition walls and the barrier ribs formed on the electrodes were formed on the plasma substrate glass, but in the present invention, parts of the partition walls are formed on the plasma substrate glass and parts of the partition walls are formed on the dielectric sheet and these are joined to each other to complete the partition walls.

According to such a method, the probability of dust invading the joined surfaces does not change from the conventional method, but even if the dust has invaded the joined surfaces, the dust does not directly come into contact with the dielectric sheet, but merely pushes the barrier ribs upward. If dust comes into direct contact with the dielectric sheet as in the prior art, one-point pressure is caused and the stress is locally concentrated in the dielectric sheet, but here the dielectric sheet gently deforms and the stress is dispersed and therefore the chance of cracking of the dielectric sheet becomes small, there is hardly any gap unevenness of the liquid crystal, and there is only a small chance of an adverse influence on the quality of the display device. Further, the joined surfaces of the barrier ribs are relatively rough and porous, and therefore even if dust is sandwiched between the joined surfaces, the dust sinks into the rough surface to a certain extent, and so the influence of the dust is reduced as a result.

BRIEF DESCRIPTION OF THE DRAWINGS

FIGS. 1(A) and 1(B) are side cross-sectional views showing steps in an embodiment of a method of production of a plasma addressed display device of the present invention.

FIGS. 2(A) and 2(B) are side cross-sectional views showing steps of another embodiment of a method of production of the plasma addressed display device of the present invention.

DETAILED DESCRIPTION OF THE PREFERRED EMBODIMENTS

Figure 3:
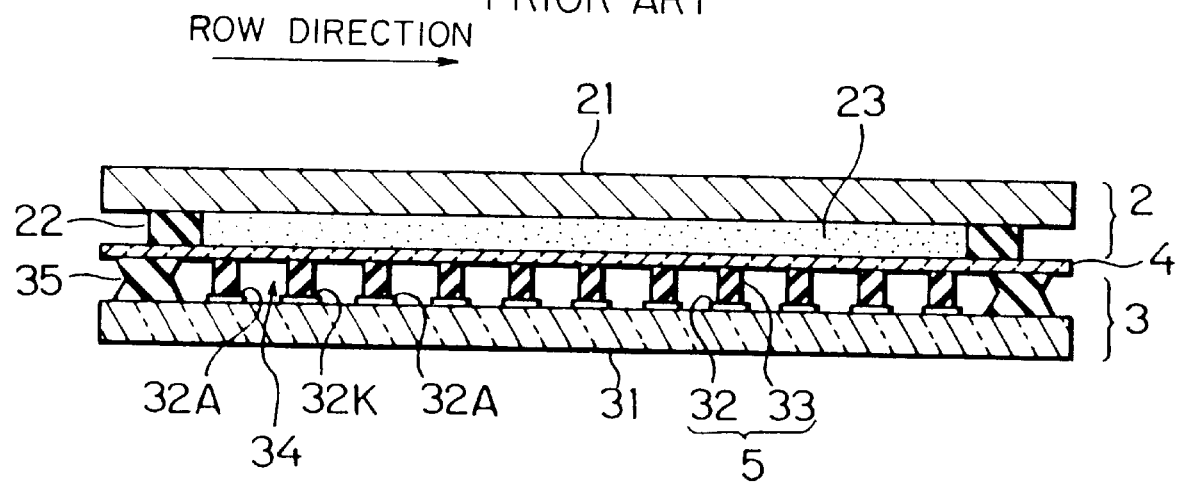
FIG. 3 is a side cross-sectional view showing an example of the known plasma addressed display device after assembly is complete.

Below, an explanation will be provided of embodiments of the present invention by referring to the drawings. FIG. 1 and FIG. 2 are cross-sectional views explaining the situation of bonding the dielectric sheet and the plasma substrate glass while completing the partition walls in the present invention.

The method of the present example includes a step of, as shown in FIG. 1(A), forming display electrodes 32 on a plasma substrate glass 31 and forming barrier ribs 33 on the dielectric sheet (a thin plate glass) 4 corresponding to these display electrodes and a step of joining these display electrodes 32 and the barrier ribs 33 to complete the partition walls 5 when bonding the dielectric sheet 4 and the plasma substrate glass 31 via the frit seal 35 as shown in FIG. 1(B).

In this case, the display electrodes 32 can be formed by various methods such as a method of performing patterning by photolithography after forming a film by the screen printing method, a vapor deposition method such as CVD, PVD, or the like, and other methods. As the electrode material, a metal such as nickel or the like is preferred, but the invention is not restricted to this.

Also, the barrier ribs 33 are formed at positions corresponding to the positions for the display electrodes 32, that is, on the dielectric sheet 4 with an equal pitch as that for the display electrodes 32. The pitch interval is about 0.69 mm in actual circumstances. As the formation method, usually a screen printing method is adopted. The printing material of the barrier ribs is a paste made by lead, ceramic, a solvent, etc. which has an expansion property similar to glass. A sufficient height for the walls cannot be obtained by a single printing step, and therefore coating is usually carried out a number of times. After the barrier ribs are printed to the predetermined height, sintering is carried out. The sintering temperature is usually about 570° C.

In the present example, the barrier ribs 33 are all formed on the dielectric sheet 4, and therefore even if dust invades between the barrier ribs 33 and the display electrodes 32, the barrier ribs 33 are lifted by the amount of the height of the dust, but unlike the case where the dust between the barrier ribs 33 and the dielectric sheet 4 gives a localized stress to the dielectric sheet, the stress is not concentrated at one point, the dielectric sheet 4 (or thin plate glass) gently deforms, and therefore there is a little chance of cracking of the dielectric sheet 4, and also there is hardly any gap unevenness of the liquid crystal layer.

In the conventional method in which the barrier ribs 33 are formed on the plasma substrate glass 31, after the sintering, usually the surfaces of the barrier ribs 33 are ground down. The object of this grinding is to make the for exposing the top surface of the ribs the same height for placement of the dielectric sheet 4 thereon. Therefore in the present example of forming the barrier ribs 33 on the dielectric sheet 4, grinding is not a particularly necessary step. Accordingly, in the present example, the grinding can be omitted, and therefore it becomes possible to lower the cost by reducing the number of the manufacturing steps.

The steps of the production method of the present example are shown in FIG. 2. This example has, as shown in FIG. 2(A) of the same figure, a step of providing the barrier ribs 33 divided into two portions, an upper and a lower portion including forming one of the portions of the barrier ribs 33a on the dielectric sheet 4; forming the other portion of the barrier ribs 33b on the display electrodes 32 formed on the plasma substrate glass 31; and a step of completing the partition walls 5 by joining these display electrodes 32 and portions of the barrier ribs 33a and 33b when bonding the dielectric sheet 4 and the plasma substrate glass 31 via the frit seal 35 as shown in FIG. 2(B).

In this case, the formation of the display electrodes 32 and the divided barrier ribs 33a and 33b can be carried out in the same way as that described above. Also, the respective heights of the divided barrier ribs can be appropriately selected.

In the present example, the rough top surfaces of the divided barrier ribs 33a and 33b become the joined surfaces, and therefore even if dust intrudes between these joined surfaces, the dust is embedded in concave portions of the surfaces of the barrier ribs to a certain extent, and therefore the effect of reducing the influence of dust is greater than that of the first embodiment. Also, the influence by the dust exerted upon the dielectric sheet similarly becomes gentle and there is little chance of the cracking of the dielectric sheet. Further, the grinding of the barrier ribs can be omitted.

Figure 4A:
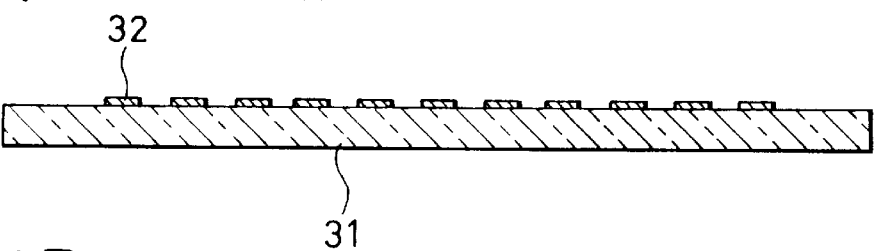
FIGS. 4(A), 4(B), 4(C), 4(D) and 4(E) are side cross-sectional views of the manufacturing steps of the plasma addressed display device of FIG. 3.
Figure 4B:
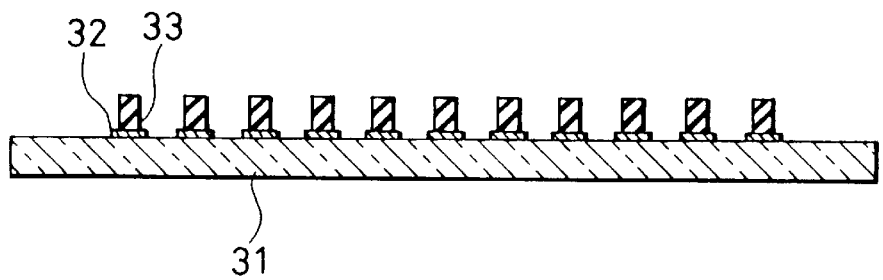
Figure 4C:
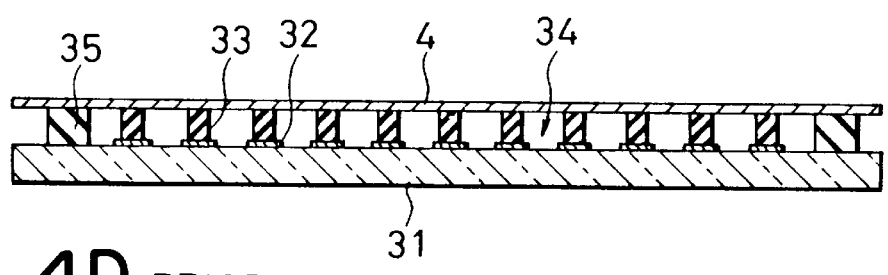

After bonding the dielectric sheet 4 and the plasma substrate glass 31 and completing the step as shown in FIG. 4(C), a gas is injected into the formed plasma chambers 34.

Figure 4D:
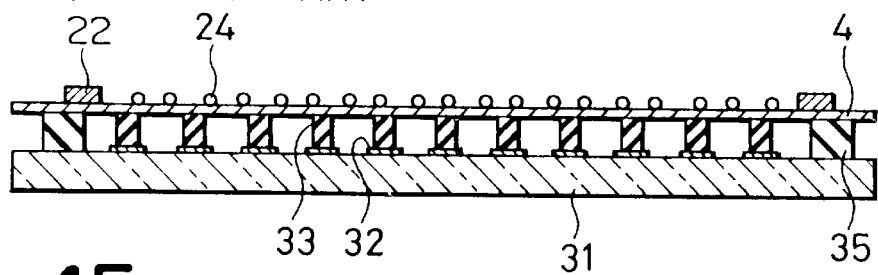
Figure 4E:
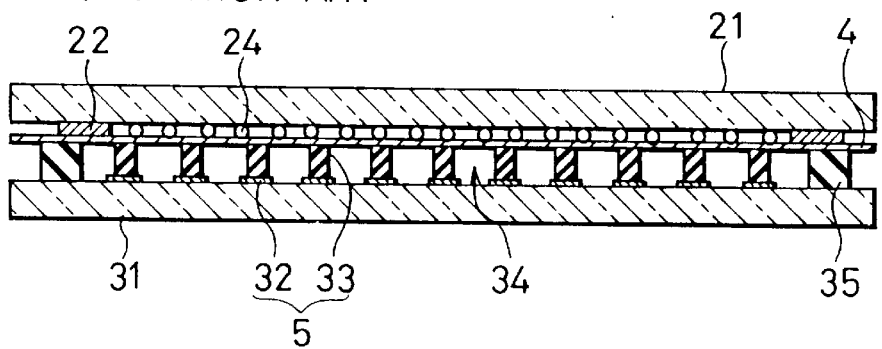
Figure 5:
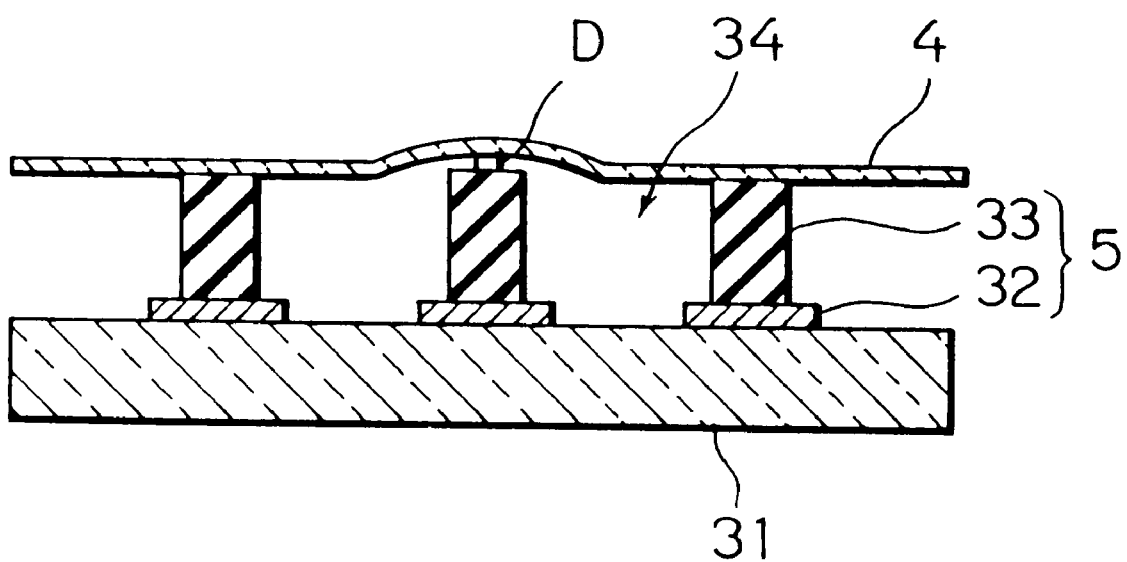
FIG. 5 is an enlarged side cross-sectional view explaining a situation where a dust particle invades in the joined surfaces between a dielectric sheet and barrier ribs.

Next, a known but not illustrated orientation processing is carried out, then as shown in FIG. 4(D), spacers 24 for making the thickness of the liquid crystal layer uniform are applied, the color filter 21 is bonded to the dielectric sheet 4 via the sealing material 22 to form a liquid crystal chamber, and then the liquid crystal is injected between the dielectric sheet and the color filter so as to form a plasma addressed display device shown in FIG. 2.

Figure 6A:
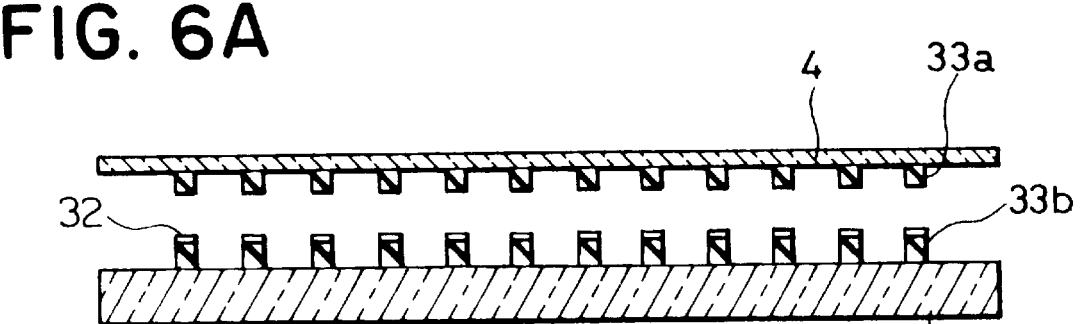
FIGS. 6(A) and (B) is a side cross-sectional view of an alternate embodiment of the method wherein the electrodes are formed on the lower portions of the ribs.
Figure 6B:
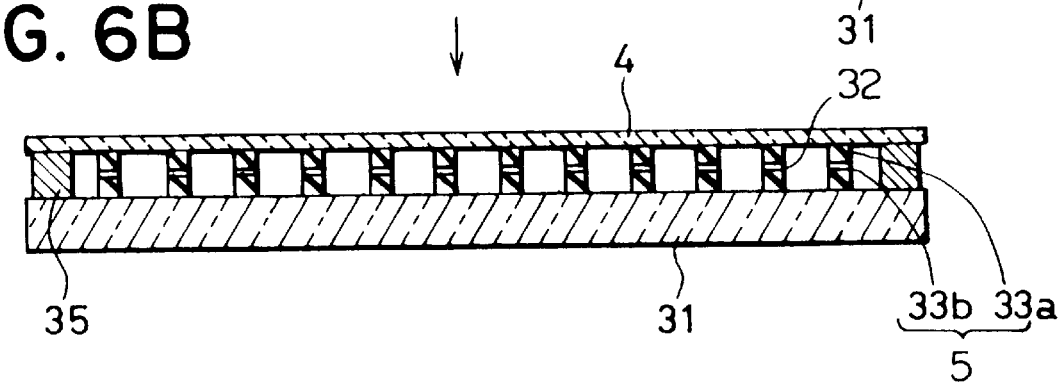

FIG. 6(A) shows an alternate embodiment of the present invention wherein upper portions 33a of the ribs are formed on the dielectric sheet 4 and lower portions 33b of the ribs are formed on the substrate 31, as in FIG. 4, for example. However, the electrodes 32 are formed on the top of the lower rib portions 33b instead of on the substrate 31. In this way, the electrodes 32 are between the upper and lower rib portions 33a and 33b when the display is assembled, as shown in FIG. 6(B). As an alternate arrangement thereto, the electrodes 32 may be formed on the lower surfaces of the upper rib portions. The same structure as shown in FIG. 6(B) would result when the display is assembled.

Yet a further alternative is to provide the entire ribs on dielectric layer 4 as shown in FIG. 1(A), but to then form the electrodes 32 on the lower ends of the ribs. The electrodes on the lower ends of the ribs are pressed directly against the substrate 31 when the display is assembled so that the same structure as shown in FIG. 1(B) results.

The present invention is not restricted to the above embodiments. For example, it is also possible to form the partition walls only by the barrier ribs without the electrodes disposed therebeneath, and other than this, change the same in various ways within the scope of the present invention.

Although other modifications and changes may be suggested by those skilled in the art, it is the intention of the inventors to embody within the patent warranted hereon all changes and modifications as reasonably and properly come within the scope of their contribution to the art.

I claim:

1. A method of manufacturing a plasma addressed display device, comprising the steps of:

forming a plurality of first electrodes on a first substrate parallel to each other;

forming a plurality of barrier ribs on an inner surface of a dielectric sheet parallel to each other;

providing a plurality of second electrodes extending perpendicularly to said first electrodes on a second substrate which is disposed with said second electrodes facing an outer surface of said dielectric sheet;

joining said first electrodes and said barrier ribs to form a plasma cell between said first substrate and said dielectric sheet;

providing an ionizable gas in said plasma cell;

providing an electro-optical layer between said dielectric sheet and said second substrate.

2. A method of manufacturing a plasma addressed display device, comprising the steps of:

forming a plurality of first electrodes on a first substrate parallel to each other;

forming a lower portions of barrier ribs on said first electrodes;

forming upper portions of barrier ribs on an inner surface of a dielectric sheet parallel to each other;

providing a plurality of second electrodes extending perpendicularly to said first electrodes on a second substrate which is disposed with said second electrodes facing an outer surface of said dielectric sheet;

joining said upper portions of said barrier ribs and said lower portions of said barrier ribs to form a plasma cell between said first substrate and said dielectric sheet;

providing an ionizable gas in said plasma cell;

providing an electro-optical layer between said dielectric sheet and said second substrate.

3. A method as claimed in claim 1, wherein said step of forming a plurality of barrier ribs forms first portions of the barrier ribs on the dielectric sheet, and further comprising the step of:

providing a plurality of second portions of barrier ribs on said first substrate; and said step of forming said plurality of first electrodes form first electrodes on said second portions of the barrier ribs.

\* \* \* \* \*